Figure 3:
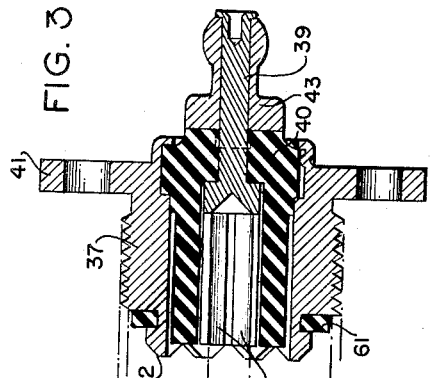

Dec. 9, 1947.                    B. A. BELS                    2,432,275
                              COUPLING DEVICE
Filed Feb. 1, 1943                                    2 Sheets-Sheet 1
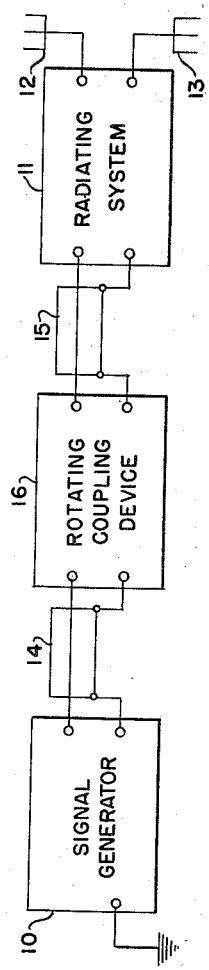
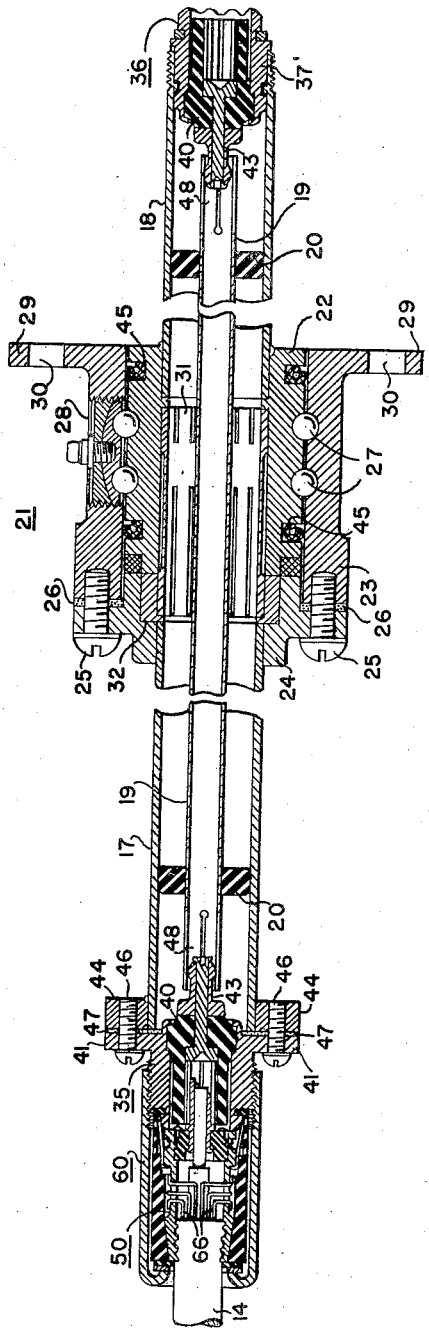
INVENTOR
BASIL A. BELS
BY
ATTORNEY Dec. 9, 1947.   B. A. BELS   2,432,275
COUPLING DEVICE
Filed Feb. 1, 1943   2 Sheets-Sheet 2

INVENTOR
BASIL A. BELS
BY Harry B. Page.
ATTORNEY

Patented Dec. 9, 1947

2,432,275

UNITED STATES PATENT OFFICE 2,432,275

COUPLING DEVICE

Basil A. Bels, Great Neck, N. Y., assignor, by mesne assignments, to Hazeltine Research, Inc., Chicago, Ill., a corporation of Illinois Application February 1, 1943, Serial No. 474,257

6 Claims. (Cl. 174—21)

This invention relates to a coupling device and, in particular, to a coupling device for coupling an electrical transmission line including a plurality of coaxially arranged conductors to an electrical translating circuit.

Rotating couplings have long been employed in hydraulic fields for lending a certain amount of flexibility to conduits used in transmitting fluids but their use in connection with electrical transmission lines is relatively new because such lines generally have an appreciable amount of inherent flexibility and thus seldom require complicated coupling devices. There are certain electrical applications, however, where rotating couplings are necessary. One of the best known of these is a direction-finding system including a highly directive and rotating antenna where a rotating coupling is required for connecting the feeder cable to the antenna.

In some such installations a gas-filled line comprising a pair of coaxially arranged conductors of brass or copper tubing is used as the antenna feeder. To accommodate the rotation of the antenna, both the inner and outer conductors are sectioned and a rotating coupling is obtained by slidably engaging adjacent sections of both conductors. A conventional gland stuffing box surrounds this junction to form a seal and prevent the escape of the gas dielectric. Arrangements of this type, however, are subject to several disadvantages. For example, if the seal between line sections fails, the gas may escape and this loss of the dielectric changes the impedance of the line causing a mismatch with the antenna. Further, the use of rigid or semi-rigid conductors such as brass or copper tubing for the transmission line is objectionable in that it causes the line to have a relatively fixed position in the installation whereas it is generally desirable to have a flexible line so that it may be moved about as required.

In other installations an attempt has been made to overcome these objections by using a rotating coupling device adapted to be connected to a feeder cable comprising a flexible transmission line having a solid dielectric. In such installations the coupling device of prior-art arrangements includes an inner conductor and a coaxially arranged outer conductor, each conductor comprising two relatively rotatable sections of brass or copper tubing. A pair of terminating devices are provided, one of which is securely fixed to one end of the coaxial conductors while the other is fixed to the opposite end of the conductors. The terminating devices permit the rotating coupling to be connected in circuit with the antenna and its feeder cable and thus permit rotatably coupling the cable to the antenna. Such an arrangement overcomes certain disadvantages of the first-mentioned installation but it, in turn, is subject to other disadvantages. For example, in order to obtain positive circuit continuity between the rotating sections of the inner conductor, it is necessary to insert a third section of brass or copper tubing between its rotating sections. Since it is extremely difficult to provide any lubrication between this third section and the inner conductor, the described coupling device has a very short service life. Additionally, the third section seldom provides uniform contact pressure with the inner conductor and causes an undue strain on that conductor in the event that the rotating sections of the device become misaligned.

Another serious problem which always arises when a coaxial transmission line having a solid dielectric is coupled to an electric translating circuit has to do with waterproofing the connections between the line and the translating circuit and it is present whether the coupling is a rotatable one or not. It will be clear that if the connections are exposed to the atmosphere, the conductor portions become corroded quickly, resulting in poor electrical contacts. While some efforts have been made to meet this problem, they heretofore have been unsuccessful. Their failure may be attributed largely to the fact that the prior-art arrangements fail to enclose the connections within an hermetically sealed chamber and consequently moisture is able to seep into the connections particularly along the outer insulating layer of the transmission line.

It is an object of the present invention, therefore, to provide an improved coupling device which avoids one or more of the above-mentioned disadvantages of prior-art arrangements.

It is a further object of the invention to provide an improved rotating coupling device for rotatably coupling an electrical transmission line including a plurality of coaxially arranged conductors to an electrical translating circuit.

Another object of the invention is to provide an improved hermetically sealed coupling device for rotatably coupling an electrical transmission line including a plurality of coaxially arranged conductors to an electrical translating circuit.

In accordance with one embodiment of the invention, a rotating coupling device for rotatably coupling an electrical transmission line including a plurality of coaxially arranged conductors to an electrical translating circuit comprises, a first conductor having two elongated relatively rotatable sections, a unitary second conductor arranged coaxially therewith to constitute a transmission-line section, and a first and second terminating means for individually making electrical connections with the conductors of the line and with the translating circuit. The device also includes means in the first terminating means connected to one end of the first conductor and means in the second terminating means connected to the other end of the first conductor. Further, there are means provided in the first terminating means connected to one end of the second conductor and self-aligning means in the second terminating means rotatably connected to the other end of the second conductor for aligning the second conductor in the terminating means.

Also in accordance with the invention, an hermetically sealed connector for connecting an electrical transmission line including a plurality of coaxially arranged conductors to an electrical translating circuit or to the aforedescribed rotating coupling comprises, a terminal element having a plurality of coaxially arranged conductor portions corresponding in number to those of the line, means for connecting the conductor portions to the corresponding conductors of the line, and means for connecting the conductor portions to the translating circuit or to the rotating coupling. The connector also includes a sealing means fitted around the external periphery of the terminal element, a sealing means fitted tightly around the external periphery of the line, a sleeve extending between both the sealing means and enclosing the connections between the terminal element and the line, and means for compressing both of the sealing means against the sleeve to form a sealed chamber around the connections of the terminal element with the line.

For a better understanding of the present invention, together with other and further objects thereof, reference is had to the following description taken in connection with the accompanying drawings, and its scope will be pointed out in the appended claims.

Figure 4:
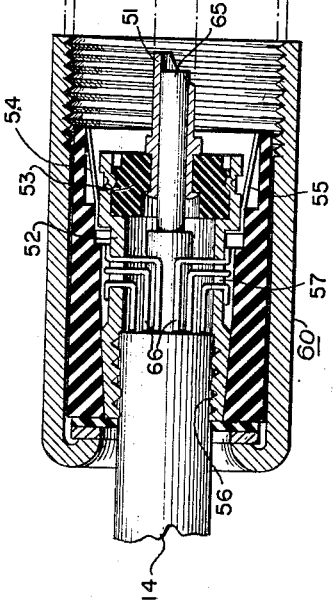
Figure 5:
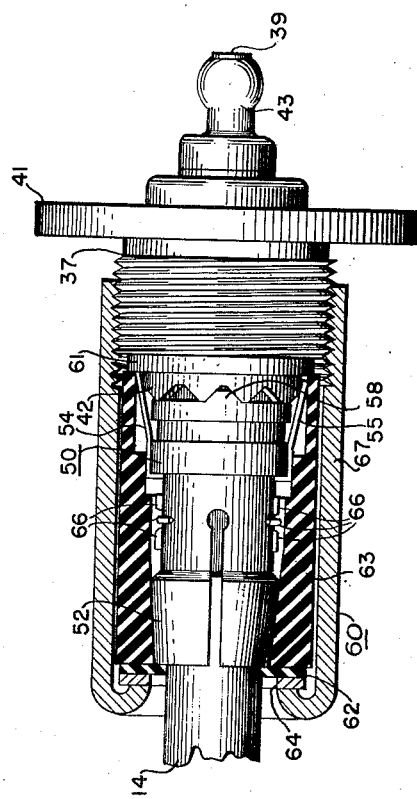

In the drawings, Fig. 1 is a schematic representation of a direction-finding system including a coupling device in accordance with this invention; Fig. 2 is a detailed view, partly in cross-section, showing the coupling device and an electrical transmission line coupled thereto through an hermetically sealed connector; while Figs. 3, 4, and 5 are enlarged sectional views illustrating in detail the parts shown in Fig. 2 for connecting a transmission line to the coupling device.

Referring now more particularly to Fig. 1, there is disclosed a direction-finding system comprising a radio beacon for transmitting direction-finding signals which may be received by aircraft and translated into direction-finding information. This system comprises a signal generator 10 and a radiating system 11 including a highly directive and rotating antenna 12, 13. The radiating system is coupled to the signal generator through an antenna feeder which includes electrical transmission lines 14 and 15 and a rotating coupling device 16 constructed in accordance with the present invention. Transmission lines 14, 15 are, preferably, solid-dielectric flexible cables of conventional construction having an inner conductor and a coaxially arranged outer conductor. Units 10 and 11 may be of any well-known and conventional design so that a detailed description of their circuits and mode of operation is unnecessary. Briefly, in the operation of the system, direction-finding signals generated in unit 10 are translated over transmission lines 14, 15 and through the coupling device 16 to the radiating system 11 where they are applied to antenna 12, 13. This antenna radiates the signals in the form of a sharply-directed beam. The rotating coupling 16, which will be described in detail hereinafter, permits the antenna to rotate with respect to transmission line 14 and through its rotation the beam is caused to sweep over an area whereby any craft within the area may receive the transmitted signals and derive therefrom direction-finding information.

Considering, now, rotating coupling device 16 of the present invention for rotatably coupling the coaxially arranged conductors of transmission line 14 to translating circuit 11 and referring particularly to Fig. 2, it will be seen that the coupling device comprises a first or outer conductor having two elongagted and relatively rotatable sections 17, 18 and a continuous second or inner conductor 19 arranged coaxially therewith. Preferably, each conductor is formed of brass or copper tubing which have relatively high conductivity and are thus suitable for extending or continuing the electrical circuits of the coaxial cable and the translating circuit adapted to be connected thereto. The coaxial arrangement of the conductors is established and maintained by a plurality of spacer rings 20 carried by the inner conductor. The spacers are of insulating material in order to insulate the circuits of the inner and outer conductors, polystyrene being selected in the preferred embodiment. The size of the spacers should be so chosen as to provide a clearance between the spacers and the outer conductor to permit the rotating section of the outer conductor to turn freely about the inner conductor.

Relative rotation between sections 17 and 18 of the outer conductor is afforded by means of a rotating joint indicated generally by the numeral 21. This rotating joint comprises an inner cylinder 22 and a two-part outer shell having a cylindrical portion 23 mounted concentrically with cylinder 22 and a flange member 24. Machine screws 25 secure flange member 24 to cylindrical portion 23 and their junction is sealed by means of an expansible rubber gasket 26. Bearing races formed in the inner wall of cylinder 23 and the outer wall of cylinder 22 accommodate ball bearings 27 which may be inserted through an opening in the outer shell. A retaining plug 28 threads into the opening to retain the ball bearings in their races and thus provide for relative rotation between cylinders 22 and 23. The outer shell, which may be considered as the stationary or fixed member of the rotating joint, is provided with a flanged portion 29 having a plurality of mounting holes 30 through which the coupling device may be mounted on a panel or pedestal.

In securing the sections of the outer conductor to the rotating joint, section 18 is inserted into cylinder 22 and soldered or brazed thereto and section 17 is inserted into flange member 24 and similarly soldered or brazed. By thus securing the outer conductor to the rotating joint, the outer conductor is caused to have two elongated and effectively telescoping sections which are free to rotate with respect to one another. Circuit continuity between the sections of the outer conductor is provided through flange member 24, machine screws 25 and concentric cylinders 23, 22. If desired, this path may be augmented by inserting a contact sleeve 31 into the rotating joint.

However, where this contact sleeve is employed, a self-lubricating ring-type bearing 32 is included in flange member 24 of the shell. A suitable material for this ring is bronze impregnated with a lubricant. Contact sleeve 31 is slotted at each end to form resilient contact elements or fingers through which uniform and positive contact pressure is obtained between the sleeve and cylinder 22 and bearing 32. The sleeve rotates with cylinder 22 within the permanently lubricated bearing formed by ring 32 and provides a direct electrical path from flange member 24 to cylinder 22.

A pair of terminating means 35, 36 are included in the rotating coupling device for individually making electrical connections with the conductors of the transmission line 14 and with the translating circuit 11 through transmission line 15. These terminating means or elements are substantially identical in construction as shown in Fig. 2. As an aid to the understanding of their construction, terminal element 35 is reproduced in Fig. 3 on an enlarged scale. Referring to that figure, it will be seen that the terminal device has a plurality of coaxially arranged conductor portions corresponding in number to those of the transmission line adapted to be connected thereto. In the arrangement under consideration transmission lines 14 and 15 have two coaxially arranged conductors and hence the terminal device has two coaxially arranged conductor portions. One of these portions comprises an outer cylinder 37 and the other comprises a socket member 38 having an extension 39. These conductor portions are preferably formed of brass and are separated by an insulating sleeve 40 which is made of a material chosen for its machinability, low dielectric constant, and its tendency to resist cold flow.

Conductor portion 37 is provided at one end with a flange 41 which comprises means for connecting the terminal element to one end of the outer conductor of the rotating coupling. This flange is coupled to an identical flange 44 on conductor section 17 by machine screws 46 and their junction is sealed through a rubber washer 47 and thus rendered watertight. By having a separable junction at this end of coupling unit 16, it is possible to secure this fixed or stationary end to a panel, if desired.

At its opposite end conductor portion 37 is shouldered to provide means for connecting to the outer conductor of a coaxial transmission line to be connected to the rotating coupling. Serrations or teeth 42 are formed on the shoulder for locking the conductor portion to the outer conductor of the transmission line.

Similarly, extension 39 of the inner conductor portion carries a contact member 43 providing means for rotatably connecting the terminal element to one end of inner conductor 19 of the rotating coupling while socket portion 38 affords means for connecting to the inner conductor of the coaxial transmission line. Contact member 43 is formed into a ball-type pivot which is inserted into the end of inner conductor 19. This member, like bearing 32, is preferably formed from an oil impregnated material to provide a self-lubricating and rotating coupling between the terminal device and the inner conductor. Socket portion 38 of the terminal element is slotted to form resilient contact fingers for engaging the inner conductor of the transmission line to be connected to the rotating coupling.

Referring now to Fig. 2, it will be seen that terminal element 36 differs from that described above only in the construction of its outer conductor portion 37' which is provided with a circumferential groove instead of a flange for securing the terminal element to the outer conductor of the rotating coupling. In connecting terminal element 36 to the rotating coupling, the terminal element is inserted into the outer conductor section 18 with its inner conductor portion extending into inner conductor 19. Conductor section 18 and the terminal element are then press fitted which effectively forms a beading on conductor section 18 within the groove of the terminal element thereby to lock these parts together.

Self-adjusting means are included in the rotating coupling device for aligning inner conductor 19 with terminating means 35, 36 so that if the sections of the outer conductor should become misaligned the inner conductor may adjust itself thereto. This means comprises the ball-type pivots 43 of the terminal elements which are engaged by resilent contact fingers 48 formed by slotting each end of the inner conductor 19. In addition to contributing to the self-aligning feature of the coupling, these contact fingers provide uniform and positive contact pressure between the inner conductor and each terminating element.

In order to protect the inner conducting surfaces of the rotating coupling from the corrosive effects of moisture and to permit using the device in outdoor installations, means are provided for sealing the telescoping sections of the outer conductor and for sealing the connections of the terminal means with the outer conductor. This means comprises packing 45 included in the rotating joint for sealing cylinders 22 and 23, sealing gasket 47 placed between flanges 41 and 44, and a coating of sealing fluid applied over the connections between the terminating means and the outer conductor.

In connecting transmission lines 14, 15 to the described rotating coupling, it will be found convenient to terminate each transmission line in a coaxial connector adapted to engage terminal elements 35, 36 and thus form electrical connections between the conductors of the line and the conducting portions of the terminal elements. The application of coaxial connectors to the transmission lines is recommeded because flexible transmission lines having a solid dielectric generally utilize a braided shield as the outer conductor and it is difficult to make connections with this outer conductor unless some sort of terminal connector is applied to the cable. A connector 50 suitable for this purpose is shown in Fig. 2 for connecting transmission line 14 to the rotating coupling. An enlarged view of the connector is included in Figs. 4 and 5 where the details of its construction may be readily seen. The connector is in the form of a coaxial plug adapted to engage with the terminal elements of the rotating coupling. It comprises an inner conducting portion 51 having the form of a projecting prong and an outer conductor portion 52 maintained in coaxial relationship therewith by means of an insulating spacer 53, these parts being held in an assembly by press fitting and peening. The conductor portions are preferably of brass. A pair of contact springs 54, 55 is secured to the outer conductor portion for providing a positive and uniform contact pressure with the terminal elements of the rotating coupling as will be described more fully hereinafter. One end of conductor portion 52 is slotted as illustrated in Fig. 5 to form a cable clamp and the jaws of the clamp are internally threaded effectively to form teeth 56 thereon for engaging the cable 14.

To apply this connector to a cable, the cable is stripped to bare its inner conductor 65 for about one-half inch and the outer insulation is stripped back about one-half inch beyond this point baring the shielded braid 66. The connector is slipped over the cable in such a way that the inner conductor 65 is received by prong 51 and the braided shield 66 is then drawn through an aperture 57 of the outer conductor portion 52. Both the inner conductor and shield are then soldered, respectively, to conductor portions 51 and 52 of the connector. To facilitate soldering the inner conductor to prong 51, the end of the prong is cut back as shown in Fig. 4. Having soldered the conductors of the cable to the connector, the jaws of the cable clamp are pressed into the outer insulation of the cable thereby to lock the connector in place.

It will be seen that with this connector applied to the cable, the cable may be connected with the rotating coupling device by inserting prong 51 of the cable connector into socket member 38 of one terminal element and by advancing the cable connector so that its outer conductor portion 52 and contact springs 54, 55 engage with the outer conductor portion 37 or 37' of the terminal element. When these parts are thus engaged, prong 51 is held into the terminal element by means of the spring fingers formed on socket member 38 and the conductor portion 52 is locked with the outer conductor portion 37 or 37' of the terminal element by a projection or tooth 58 formed on conductor portion 52 which engages with the teeth 42 formed on conductor portion 37 or 37'. This engagement is shown in Fig. 5.

While suitable electrical connections are established between the conductors of the transmission line and the corresponding conductor portions of the terminal elements of the rotating coupling through the engagement of cable connector 50 with a terminal element, it will be seen that the waterproof feature of the coupling device is defeated or rendered valueless unless the connections between the transmission lines and the terminal elements are also sealed or made waterproof. These connections are sealed by providing terminal elements 35, 36 with an arrangement co-operating therewith to form an hermetically sealed connector for connecting the transmission lines to the coupling device. This arrangement is shown assembled in Fig. 2 applied to terminal element 35 for connecting transmission line 14 to the coupling device and is indicated generally by numeral 60. For the sake of clarity, it is reproduced in Fig. 5 where the details of its construction clearly appear. Referring to this figure, it will be seen that the arrangement includes a sealing means comprising a sealing washer 61 of rubber composition or other suitable material fitted tightly around conductor portion 37 of the terminal element and a similar sealing means 62 of like material and form fitted tightly around the transmission line ahead of its terminal connector 50. A sleeve 63 of suitable insulating material is placed around the connections between the transmission line and the terminal element extending between the sealing washers 61, 62. A brass washer 64 fits loosely around the transmission line ahead of the sealing washer 62 and a cover 67 is placed around the entire connection. One end of this cover is internally threaded and engages an external thread provided on conductor portion 37 of terminal element 35. As this cover is threaded onto the terminal element, it causes the sealing washers to be compressed against the insulating sleeve 63. Compressing washer 62 causes it to expand and to be driven against the outer insulating layer of the transmission line thereby to form a seal around the line and prevent moisture from entering into the connection along the line. In like manner, washer 61 forms a seal at the opposite end of the connector whereby moisture entering through the threaded engagement of cover 67 and the terminal element is prevented from reaching the electrical connections between the transmission line and the terminal element. It will be seen, therefore, that the cover through its engagement with the terminal element comprises means for compressing the sealing devices thereby to form a sealed chamber around the connections of the terminal element with the line. Brass washer 64 is provided so that rotation of the cover will not introduce a torsional strain on sealing washer 62. The sleeve 63 is shouldered internally to engage contact springs 54, 55 holding the springs in place and causing them to exert a positive contact pressure against the outer conductor portion of the terminal element.

In the above description of the hermetically sealed connector, specific reference was made to effecting the connection of transmission line 14 with terminal element 35 of the rotating coupling. It will be clear that an hermetically sealed connection is formed in like manner by similarly connecting transmission line 15 with terminal element 36. In this case, however, since the conductor portion 37' is substantially entirely within outer conductor section 18 of the rotating coupling, the outer conductor section is provided with an external thread for receiving the connector cover 67. It will be understood that transmission line 15 is to be terminated in a coaxial connector 50 and that sealing washers 61, 62, a compression sleeve 63, and cover 67 cooperate with terminal element 36, as explained in connection with Fig. 5, in forming a sealed chamber around the connections of the terminal element with the line.

It will also be understood that in any case where an hermetically sealed connection of the type above-described is to be formed, the connector parts are to be assembled on the transmission line in the following order: cover 67, brass washer 64, sealing washer 62, compression sleeve 63, and the terminal connector 50.

In considering the operation of the described rotating coupling in the direction-finding system of Fig. 1, it will be understood that transmission lines 14 and 15 are coupled through the above-described hermetically sealed connectors to the coupling device. In this arrangement the electrical circuits of the transmission lines are completed through the terminating elements and coaxial conductors of the rotating coupling and all circuit connections are sealed and thus protected against moisture. As the antenna 12, 13 rotates, its feeder cable 15 is permitted to rotate through the relative rotation provided between conductor sections 17, 18 and the rotation provided between terminal devices 35, 36 and the unitary inner conductor 19.

The conductor portions of the rotating coupling may be silver-plated to provide maximum conductivity. The radii of the coaxial conductors included in the coupling are proportioned, in accordance with well-known practice, to provide proper impedance matching.

The described coupling device is bi-directional. That is, current may flow therethrough equally well in two directions so that the device may be readily used in systems employing a single antenna for both receiving and transmitting signals.

While in the preferred embodiment of the invention inner conductor 19 is rotatably connected with each of the terminal elements 35 and 36. the coupling may be constructed with relative rotation provided between the inner conductor and only one terminal element. It will also be understood that transmission line 15 may be omitted. In such a case coupling device 16 may be connected directly with antenna 12, 13.

The hermetically sealed connector for connecting the transmission lines to the rotating coupling is particularly useful in preserving the waterproof feature of the coupling device. A sealed connector of this type, however, has a broad application and may be readily used apart from the rotating coupling. It may be used, for example, in connecting a transmission line directly to a translating circuit or device. For this purpose, a terminal element constructed like element 35 may be connected to the transmission line as illustrated in Fig. 5 whereby the connections between the terminal element and line are hermetically sealed. The translating circuit or device may then be directly connected to the coaxially arranged conductor portions of the terminal element. It will be apparent that in such an installation terminal element 35 along with the sealing arrangement 60 comprise an hermetically sealed connector for connecting an electrical transmission line including a plurality of coaxially arranged conductors to an electrical translating circuit.

While there has been described what is at present considered to be the preferred embodiment of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A rotating coupling device for rotatably coupling an electrical transmission line including a plurality of coaxially arranged conductors to an electrical translating circuit comprising, a first conductor having two elongated relatively rotatable sections, a unitary second conductor arranged coaxially therewith to constitute a transmission-line section, a first and a second terminating means for individually making electrical connections with the conductors of said line and with said translating circuit, means in said first terminating means connected to one end of said first conductor, means in said second terminating means connected to the other end of said first conductor, means in said first terminating means connected to one end of said second conductor, means in said second terminating means rotatably connected to the other end of said second conductor, a sealing means fitted around the external periphery of the one of said terminating means which makes electrical connections with said line, a sealing means fitted tightly around the external periphery of said line, a sleeve extending between both said sealing means and enclosing the connections between said one terminating means and said line, and means for compressing both said sealing means against said sleeve to form a sealed chamber around the connections of said one terminating means with said line.

2. A rotating coupling device for rotatably coupling an electrical transmission line including a plurality of coaxially arranged conductors to an electrical translating circuit comprising, a first conductor having two elongated relatively rotatable sections, a unitary second conductor arranged coaxially therewith to constitute a transmission-line section, a first and a second terminating means for individually making electrical connections with the conductors of said line and with said translating circuit, means in said first terminating means connected to one end of said first conductor, means in said second terminating means connected to the other end of said first conductor, means in said first terminating means connected to one end of said second conductor, and self-aligning means in said second terminating means rotatably connected to the other end of said second conductor for aligning said second conductor in said terminating means.

3. A rotating coupling device for rotatably coupling an electrical transmission line including a plurality of coaxially arranged conductors to an electrical translating circuit comprising, a first conductor having two elongated relatively rotatable sections, a unitary second conductor arranged coaxially therewith to constitute a transmission-line section, a first and a second terminating means for individually making electrical connections with the conductors of said line and with said translating circuit, means in said first terminating means connected to one end of said first conductor, means in said second terminating means connected to the other end of said first conductor, means in said first terminating means connected to one end of said second conductor, and ball-type pivot means in said second terminating means rotatably connected to the other end of said second conductor for automatically aligning said second conductor in said terminating means.

4. An hermetically sealed connector for connecting an electrical transmission line including a plurality of coaxially arranged conductors to an electrical translating circuit comprising, a terminal element having a plurality of coaxially arranged conductor portions corresponding in number to those of said line, means for connecting said portions to the corresponding conductors of said line, means for connecting said portions to said translating circuit, a sealing means fitted around the external periphery of said terminal element, a sealing means fitted around the external periphery of said line, a sleeve extending between both said sealing means and enclosing the connections between said terminal element and said line, and means for compressing both said sealing means against said sleeve to form a sealed chamber around the connections of said terminal element with said line.

5. An hermetically sealed connector for connecting an electrical transmission line including a plurality of coaxially arranged conductors to an electrical translating circuit comprising, a terminal element having a plurality of coaxially arranged conductor portions corresponding in number to those of said line, means for connecting said portions to the corresponding conductors of said line, means for connecting said portions to said translating circuit, resilient sealing means fitted around the external periphery of said terminal element, resilient sealing means fitted around the external periphery of said line, a sleeve extending between both said sealing means and enclosing the connections between said terminal element and said line, and means for compressing both said sealing means against said sleeve to expand said first-named sealing means against said terminal device and said second-named sealing means against said line to form a sealed chamber around the connections of said terminal element with said line.

6. An hermetically sealed connector for connecting an electrical transmission line including a plurality of coaxially arranged conductors to an electrical translating circuit comprising, a terminal element having a plurality of coaxially arranged conductor portions corresponding in number to those of said line, means for connecting said portions to the corresponding conductors of said line, means for connecting said portions to said translating circuit, a sealing means fitted around the external periphery of said terminal element, a sealing means fitted tightly around the external periphery of said line, a sleeve extending between both said sealing means and enclosing the connection between said terminal element and said line, and means for compressing both said sealing means against said sleeve to form a sealed chamber around the connections of said terminal element with said line and for providing a cover around said sealed chamber.

BASIL A. BELS.

REFERENCES CITED

The following references are of record in the file of this patent:

UNITED STATES PATENTS

| Number | Name | Date |
| --- | --- | --- |
| 1,484,992 | Kijima | Feb. 26, 1924 |
| 2,135,223 | Scheiwer | Nov. 1, 1938 |
| 2,135,221 | Scheiwer | Nov. 1, 1938 |
| 1,870,959 | Morrison | Aug. 9, 1932 |
| 2,331,136 | Peterson | Oct. 5, 1943 |
| 2,176,718 | Linde | Oct. 17, 1939 |
| 2,345,019 | Van Alstyne | Mar. 28, 1944 |
| 2,294,738 | Bruno | Sept. 1, 1942 |
| 2,332,529 | Reppert | Oct. 26, 1943 |

FOREIGN PATENTS

| Number | Country | Date |
| --- | --- | --- |
| 104,520 | Great Britain | Mar. 7, 1917 |